(12) United States Patent
Noderer

(10) Patent No.: US 10,476,417 B2
(45) Date of Patent: Nov. 12, 2019

(54) GAS TURBINE GENERATOR TORQUE DC TO DC CONVERTER CONTROL SYSTEM

(71) Applicant: Rolls-Royce North American Technologies Inc., Indianapolis, IN (US)

(72) Inventor: Keith D. Noderer, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 57 days.

(21) Appl. No.: 15/675,694

(22) Filed: Aug. 11, 2017

(65) Prior Publication Data

US 2019/0052208 A1 Feb. 14, 2019

(51) Int. Cl.
| | |
|---|---|
| *H02P 9/04* | (2006.01) |
| *H02P 9/10* | (2006.01) |
| *F02C 9/00* | (2006.01) |
| *F02C 9/28* | (2006.01) |

(52) U.S. Cl.
CPC .......... *H02P 9/04* (2013.01); *F02C 9/00* (2013.01); *F02C 9/28* (2013.01); *H02P 9/10* (2013.01); *F05D 2270/024* (2013.01); *F05D 2270/061* (2013.01)

(58) Field of Classification Search
CPC .............. H02P 9/04; H02P 9/10; F02C 9/00
See application file for complete search history.

(56) References Cited

U.S. PATENT DOCUMENTS

| | | | | |
|---|---|---|---|---|
| 4,444,285 A | * | 4/1984 | Stewart | B60K 6/46 180/65.245 |
| 5,198,698 A | | 5/1993 | Paul et al. | |
| 5,563,802 A | * | 10/1996 | Plahn | H02J 9/062 290/1 R |

(Continued)

FOREIGN PATENT DOCUMENTS

| | | |
|---|---|---|
| EP | 0680139 A1 | 11/1995 |
| EP | 0947042 B2 | 10/1999 |

(Continued)

OTHER PUBLICATIONS

Chen, Jessie W., Lindtjørn, John O., Wendt, Frank, "Hybrid marine electric propulsion system," downloaded Aug. 8, 2017, pp. 1-10.

*Primary Examiner* — Tulsidas C Patel
*Assistant Examiner* — Joseph Ortega
(74) *Attorney, Agent, or Firm* — Brinks Gilson & Lione

(57) ABSTRACT

A system includes a first controller configured to control a gas turbine to operate at a constant speed set point and a variable torque output to drive a generator. A DC to DC converter may operate as a load on a power source bus supplied by the generator. A second controller may limit a rate of change of the DC output power of the DC to DC converter during intermittent supply of a transient step change load subsequent to receipt of a transient load control signal. The transient load control signal is anticipatory of application of the transient step change load to the load bus. The rate of change is limited by the second controller to maintain the variable torque of the gas turbine below a predetermined threshold as a load ramp rate of the DC to DC converter changes on the power source bus.

20 Claims, 5 Drawing Sheets

(56) References Cited

U.S. PATENT DOCUMENTS

| | | | | |
|---|---|---|---|---|
| 5,684,690 | A * | 11/1997 | Levedahl | B63H 23/24 290/4 R |
| 6,175,217 | B1 | 1/2001 | Da Ponte et al. | |
| 6,670,721 | B2 * | 12/2003 | Lof | H02J 3/381 290/44 |
| 7,190,133 | B2 * | 3/2007 | King | B60L 50/50 318/375 |
| 8,738,311 | B2 * | 5/2014 | Wu | G01R 31/367 702/63 |
| 9,287,789 | B2 * | 3/2016 | Cornell | H02M 3/3353 |
| 10,128,785 | B1 * | 11/2018 | Stitt | H02P 9/102 |
| 2002/0084655 | A1 * | 7/2002 | Lof | F03D 7/0284 290/44 |
| 2002/0158517 | A1 * | 10/2002 | Rouse | F02C 9/18 307/151 |
| 2004/0041404 | A1 | 3/2004 | McConnell | |
| 2004/0251881 | A1 * | 12/2004 | Haydock | H02P 9/04 322/24 |
| 2005/0056021 | A1 * | 3/2005 | Belokon | F02C 3/113 60/772 |
| 2005/0126171 | A1 * | 6/2005 | Lasker | F02C 1/04 60/645 |
| 2007/0121354 | A1 * | 5/2007 | Jones | H02M 5/4585 363/47 |
| 2008/0157591 | A1 | 7/2008 | Fattal et al. | |
| 2009/0285259 | A1 | 11/2009 | Allen et al. | |
| 2010/0038907 | A1 * | 2/2010 | Hunt | E21B 41/0085 290/7 |
| 2010/0154428 | A1 * | 6/2010 | Yu | F01K 23/068 60/772 |
| 2010/0164234 | A1 * | 7/2010 | Bowman | F02C 7/32 290/1 R |
| 2010/0164428 | A1 * | 7/2010 | Xu | F01D 15/10 318/767 |
| 2010/0283242 | A1 * | 11/2010 | Dooley | F02C 7/268 290/31 |
| 2011/0169443 | A1 * | 7/2011 | Baker | H02P 23/04 318/807 |
| 2011/0259016 | A1 * | 10/2011 | Winston | F02C 7/26 60/778 |
| 2011/0289934 | A1 * | 12/2011 | Desabhatla | F02C 7/26 60/778 |
| 2011/0315815 | A1 | 12/2011 | Finney | |
| 2012/0056474 | A1 * | 3/2012 | Larson | B60R 16/03 307/9.1 |
| 2012/0297788 | A1 | 11/2012 | Panov | |
| 2013/0041517 | A1 | 2/2013 | Nelson et al. | |
| 2013/0093193 | A1 | 4/2013 | Schmidt et al. | |
| 2013/0111920 | A1 | 5/2013 | Hamrin et al. | |
| 2013/0181688 | A1 * | 7/2013 | Tupper | H02P 9/02 322/61 |
| 2014/0000279 | A1 | 1/2014 | Brousseau et al. | |
| 2014/0091622 | A1 * | 4/2014 | Lucas | H02J 3/32 307/19 |
| 2014/0103651 | A1 * | 4/2014 | Grinblat | H02P 9/48 290/44 |
| 2014/0139016 | A1 * | 5/2014 | Lovercheck | B60L 1/003 307/9.1 |
| 2014/0197644 | A1 | 7/2014 | White et al. | |
| 2014/0271114 | A1 * | 9/2014 | Phillips | G05B 23/0294 415/1 |
| 2014/0338352 | A1 * | 11/2014 | Edwards | F02C 3/113 60/774 |
| 2014/0361624 | A1 | 12/2014 | Ault et al. | |
| 2015/0014994 | A1 * | 1/2015 | Nordstrom | F02C 7/10 290/52 |
| 2015/0054283 | A1 * | 2/2015 | Huang | H02K 23/52 290/46 |
| 2015/0084339 | A1 * | 3/2015 | McDaniel | H02J 3/381 290/50 |
| 2015/0102679 | A1 | 4/2015 | Nielsen et al. | |
| 2015/0171705 | A1 * | 6/2015 | Hino | F01D 15/10 290/1 A |
| 2015/0233266 | A1 * | 8/2015 | Firkan | F01K 15/04 60/650 |
| 2015/0244296 | A1 * | 8/2015 | Edwards | F02C 9/00 290/40 B |
| 2016/0036308 | A1 * | 2/2016 | Bailey | H02K 21/024 290/45 |
| 2016/0046247 | A1 * | 2/2016 | Rozman | B60R 16/03 290/8 |
| 2016/0229547 | A1 | 8/2016 | Fisher et al. | |
| 2016/0301333 | A1 * | 10/2016 | Rozman | H02K 19/365 |
| 2016/0308423 | A1 * | 10/2016 | Rozman | H02K 11/33 |
| 2016/0320784 | A1 | 11/2016 | Sunley et al. | |
| 2017/0044948 | A1 | 2/2017 | Caine et al. | |
| 2017/0082090 | A1 | 3/2017 | Barton et al. | |
| 2017/0138272 | A1 * | 5/2017 | Kusumi | F02C 7/057 |
| 2017/0159577 | A1 * | 6/2017 | Hino | H02J 3/46 |
| 2017/0194887 | A1 * | 7/2017 | Kataoka | H02P 9/302 |
| 2017/0363013 | A1 * | 12/2017 | Hino | F01D 15/10 |
| 2018/0026569 | A1 * | 1/2018 | Yoshimura | H02P 27/14 290/31 |
| 2018/0115163 | A1 | 4/2018 | Nielsen et al. | |
| 2018/0179960 | A1 * | 6/2018 | Apte | F02C 6/14 |
| 2018/0187604 | A1 * | 7/2018 | Poumarede | B64D 35/08 |
| 2018/0202315 | A1 | 7/2018 | Coldwate | |
| 2018/0252158 | A1 * | 9/2018 | Malkamaki | F02C 1/06 |
| 2018/0265206 | A1 * | 9/2018 | Himmelmann | B64D 27/24 |
| 2018/0278193 | A1 * | 9/2018 | Gurkaynak | H02S 40/30 |
| 2018/0354632 | A1 | 12/2018 | Hon et al. | |
| 2018/0372003 | A1 | 12/2018 | Hon et al. | |
| 2019/0052205 | A1 | 2/2019 | Noderer | |
| 2019/0052206 | A1 | 2/2019 | Noderer | |
| 2019/0190425 | A1 * | 6/2019 | Tiwari | H02P 21/22 |

FOREIGN PATENT DOCUMENTS

| | | |
|---|---|---|
| WO | WO 2004/038892 A2 | 5/2004 |
| WO | WO 2012/116378 A2 | 8/2012 |

* cited by examiner

GAS TURBINE GENERATOR TORQUE DC TO DC CONVERTER CONTROL SYSTEM

TECHNICAL FIELD

This disclosure relates to gas turbine generators and more specifically to a gas turbine generator DC to DC converter control system.

BACKGROUND

Gas turbines provide torque on a rotating shaft by combustion of fuel to rotate a compressor and downstream turbine. An AC (alternating current) or DC (direct current) generator converts mechanical power into electric power. Generators may include a rotor and a stator where the rotor or the stator is coupled with a rotating prime mover to generate electric power. DC to DC converters may receive a DC voltage at a magnitude and convert the received input DC voltage to a different magnitude of DC output voltage. The voltage level of the different magnitude of output voltage may be regulated by the DC to DC converter. Many DC to DC converters are switch mode converters, which use switching techniques to convert a DC input voltage to a different DC output voltage. The conversion may result in an increased DC voltage at the output or a decreased DC voltage at the output when compared to the input voltage.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a system includes a gas turbine controlled to rotate at a constant rated speed and a variable torque to drive a generator in accordance with a load being supplied by the generator. The generator may output electric power to a power source bus. A DC to DC converter coupled to the power source bus may be energized as at least part of the load being supplied by the generator. A level of a DC output power output by the DC to DC converter on a load bus may be controlled. The load bus may also be supplied with DC power supplied from an energy storage device. A transient load control signal may be received that is indicative of an anticipated future occurrence of a step change load event on the load bus. The step change load event may be received on the load bus after receipt of the transient load control signal. The level of the DC output power of the DC to DC converter may be adjusted in response to the step change load event. A constraint on a rate of change of the level of the DC output power of the DC to DC converter may be constrained. The constraint may be applied based on the transient load signal to maintain the variable torque of the generator below a predetermined threshold as a load ramp rate of the DC to DC converter changes on the power source bus.

An interesting feature of the systems and methods described is that the constraint on the rate of change may be varied based on the projected magnitude of the step change load event.

Another interesting feature of the systems and methods described is that the rate of change of the level of the DC output power of the DC to DC converter may be constrained when the projected magnitude of the step change load event is greater than a predetermined step change that is projected to cause the variable torque of the generator to exceed a predetermined amount.

Figure 1:
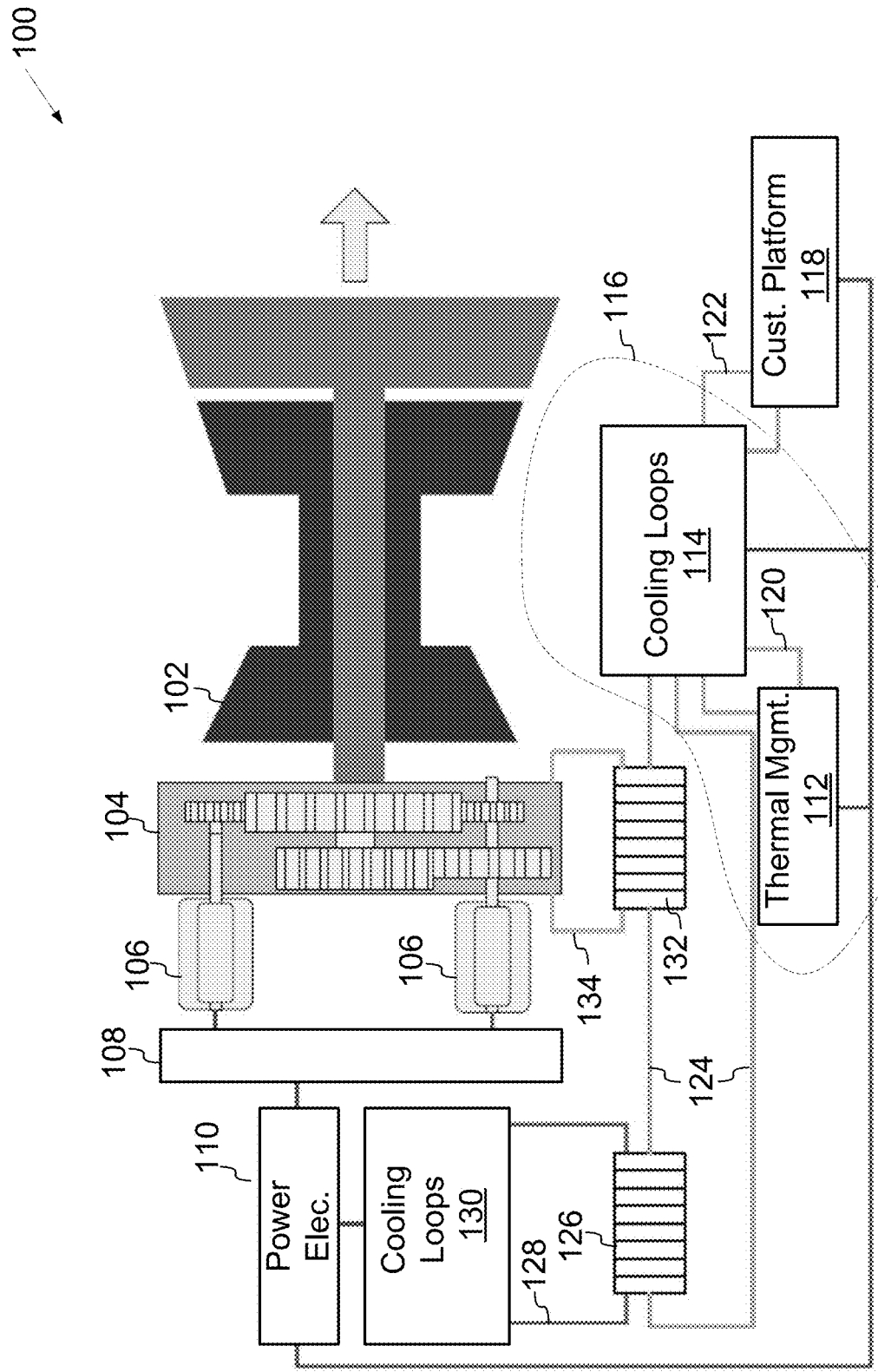
FIG. 1 illustrates a schematic of an example of an integrated power and thermal management system.

FIG. 1 illustrates a schematic of an example of an integrated power and thermal management system 100. The system 100 may include an engine 102, a gearbox 104, a generator 106 (two generators are shown in FIG. 1), an electrical bus 108 for the generator 106, power electronics 110, thermal management system components 112, and thermal management coolant loops 114.

The engine 102 may include any source of mechanical power that can drive the generator 106. Examples of the engine 102 may include a gas turbine engine, an internal combustion engine, a gas engine, a reciprocating engine, a diesel engine, a turbo fan, any other type of engine, propeller(s) of a wind turbine, and any other source of mechanical power. The engine 102 represented in FIG. 1 is a gas turbine engine.

The gearbox 104 may include any device that performs speed and/or torque conversions from a rotating power source to another device. Examples of the gearbox 104 may include gears, a gear train, a transmission, or any other type of device that performs rotational speed and/or torque conversions.

The generator 106 may include any type of electrical generator. Examples of the generator 106 may include a synchronous generator, an induction generator, an asynchronous generator, a permanent magnet synchronous generator, an AC (Alternating Current) generator, a DC (Direct Current) generator, a synchronous generator with stator coils, or any other device that converts mechanical power to electric power.

The electrical bus 108 may include any connector or connectors that conduct electricity. Examples of the electrical bus 108 may include a busbar, a busway, a bus duct, a solid tube, a hollow tube, a wire, an electrical cable, or any other electrical conductor.

The power electronics 110 may include any device or combination of devices that control and/or convert electric power. Examples of the power electronics 110 may include a power converter, a rectifier, an AC to DC converter, a switching device, a diode, a thyristor, an inverter, a transistor, and a capacitor. The power electronics 110 may include semiconductor and/or solid state devices.

The thermal management system components 112 may include any component of a thermal management system. Examples of the thermal management system components 112 may include a thermal energy storage, a vapor cycle system (VCS), a conventional air cycle system (ACS), a compressor, a valve, a gas cooler, a heat exchanger, a recuperator, an evaporator, a condenser, a battery, a coolant pump, a controller, and any other component of any type of cooling system. The thermal management system components 112 together and/or separately may have a capability to provide cooling and/or heating.

As described in more detail below, the cooling and/or heating provided by the thermal management system components 112 may be distributed by a coolant, such as ethylene glycol and water (EGW) or propylene glycol and water (PGW), through the thermal management coolant loops 114. In more general terms, the combination of the thermal management system components 112 and the thermal management coolant loops 114 form a thermal management system 116. The thermal management system 116 may provide cooling and/or heating to one or more target devices or target components.

During operation of the integrated power and thermal management system 100 (IPTMS), the IPTMS 100 may provide electrical power to a customer platform component 118. Alternatively or in addition, the IPTMS 100 may cool and/or heat the customer platform component 118. The electrical power may by generated by the generator 106 of the IPTMS 100 and the cooling and/or the heating may be provided by the thermal management system 116 of the IPTMS 100.

The customer platform component 118 may include any device or combination of devices that consumes electricity that may benefit from cooling and/or heating. Examples of the customer platform component 118 may include solid state electronics, a light-emitting diode (LED), an analog circuit, a digital circuit, a computer, a server, a server farm, a data center, a hoteling circuit such as vehicle electronics, a vehicle, an aircraft, a directed-energy weapon, a laser, a plasma weapon, a railgun, a microwave generator, a pulse-powered device, a satellite uplink, an electrically-driven machine, an electrically driven motor, or any other electronic device that benefit from heating and/or cooling.

The integrated power and thermal management system 100 may be considered "integrated" because electrical power generated by the IPTMS 100 may power devices within the IPTMS 100, such as components of the thermal management system 116. Alternatively or in addition, the thermal management system 116 may cool and/or heat components of the IPTMS 100, such as the power electronics 110, the gear box 104, or any component of the engine 102.

As mentioned above, the cooling and/or heating provided by the thermal management system components 112 may be distributed by a coolant via the thermal management coolant loops 114. The thermal management coolant loops 114 may include independent loops in which coolant is circulated using, for example, pumps. Heat may be exchanged between two independent loops using a heat exchanger, such as a recuperator, an evaporator, or a condenser.

For example, a first loop 120 may be cooled by the thermal management system components 112. The cooled coolant in the first loop 120 may cool a coolant in a second loop 122 via a heat exchanger (not shown). In cooling the coolant in the second loop 122, the coolant in the first loop 120 may become warmer. The warmed coolant in the first loop 120 may be pumped back to the thermal management system components 112 where the coolant is again cooled. Meanwhile, the cooled coolant in the second loop 122 may be pumped to the customer platform component 118 where the coolant cools the customer platform component 118. In cooling the customer platform component 118, the coolant in the second loop 122 may become warmer. The warmed coolant in the second loop 122 may be pumped back to the heat exchanger where the coolant is again cooled by the first loop 120 via the heat exchanger.

In another example, the cooled coolant in the first loop 120 may cool a coolant in a third loop 124 via a heat exchanger (not shown) in a similar manner. The cooled coolant in the third loop 124 may cool the power electronics 110 by passing through a power electronics heat exchanger 126 that cools a coolant in a fourth loop 128. The cooled coolant in the fourth loop 128 may cool the power electronics 110 and/or cool one or more additional independent cooling loops 130 that in turn cool the power electronics 110.

Alternatively or in addition, the cooled coolant in the third loop 124 (or the warmed coolant in the third loop 124 that exits the power electronics heat exchanger 126) may pass through a gear box heat exchanger 132. The coolant in the third loop 124 that passes through the gear box heat exchanger 132 may cool oil in an oil loop 134 that flows through the gear box 104. In such a configuration, the thermal management system 116 may cool the oil in the gear box 104.

The thermal management coolant loops 114, such as the first loop 120, the second loop 122, the third loop, 124, and the fourth loop 128, that are illustrated in FIG. 1 are simply examples of the thermal management coolant loops 114. In other examples, the thermal management coolant loops 114 may include additional, fewer, or different coolant loops than shown in FIG. 1. Alternatively or in addition, the thermal management system 116 may cool additional, fewer, or different components of the IPTMS 100 than shown in FIG. 1.

With respect to generating electrical power, the engine 102 may cause a shaft of the generator 106 to rotate via the gearbox 104 during operation of the IPTMS 100. As the shaft of the generator 106 rotates, the generator 106 may generate electricity. The electrical bus 108 may transmit the generated electricity to the power electronics 110. The power electronics 110 may transform, control, and/or store the generated electricity. For example, the power electronics 110 may convert AC current generated by the generator 106 into DC current for delivery to the customer platform component 118. The power electronics 110 may deliver electricity to one or more components of the thermal management system 116 and/or to any other component of the IPTMS 100.

The IPTMS 100 may include additional, fewer, or different components than shown in FIG. 1. For example, the IPTMS 100 may include additional or fewer heat exchangers than shown in FIG. 1. As another example, the IPTMS 100 may not include the additional independent cooling loops 130 that cool the power electronics 110. In still another example, the power electronics 110 may be integrated with the generator 106 so as to eliminate the discrete electrical bus 108 shown in FIG. 1. In yet another example, the IPTMS 100 may include a single generator. In some examples, the IPTMS 100 may not include the gearbox 104. Instead, the generator 106 may be directly coupled to a mechanical output, such as a shaft, of the engine 102.

Figure 2:
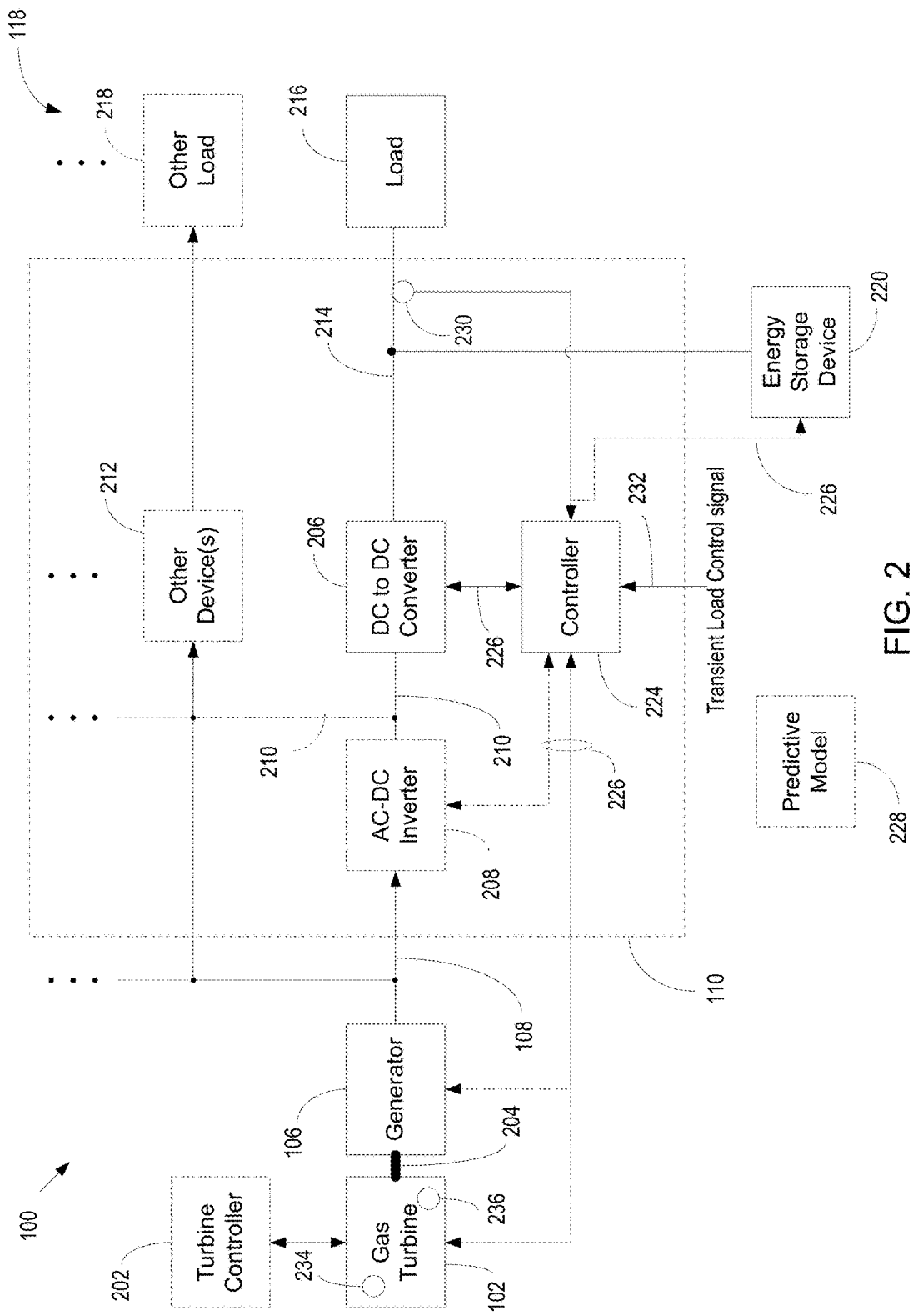
FIG. 2 is a block diagram of an example of a portion of a power system that includes power electronics included in the system.

FIG. 2 is a block diagram of an example of a portion of a power system that includes the power electronics 110 included in the IPTMS 100. In the example of FIG. 2, the gas turbine 102 is controlled with a turbine controller 202 to operate at a constant rated speed and a variable torque to rotate an output shaft 204. The turbine controller 202 may include a memory and one or more processors and/or other devices capable of performing logic to control the operation of the gas turbine 200. The generator 106 is rotatably coupled with the output shaft 204, and is driven by the gas turbine 200 to supply electric power to the electrical bus 108, which supplies power to the customer platform 118. The gas turbine 200 may include the engine 102, gearbox 104, thermal management system 116, and gear box heat exchanger 132, as illustrated in the example of FIG. 1. In other examples, other configurations of one or more gas turbines 200 may be used to rotate one or more generators 106 to supply electric power to the electrical bus 108. The electrical bus 108 may also supply power directly to the customer platform 118 (without the power electronics 110), and/or may supply any other loads or busses. In an example configuration, the electrical bus may be a 700 VAC bus.

The power electronics 110, or power system, may include a DC to DC converter 206 which receives power such as direct current (DC) voltage and current from the electrical power source bus 108. In examples where the generator 106 provides alternating current (AC) power, the power electronics 110 may also include an inverter 208 to convert the AC power to DC power supplied on a power source bus 210. Where the generator 106 supplies DC power, the inverter 208 may be omitted and the electrical bus 108 and the power source bus 210 may receive similar voltage and current. The power electronics 110 may also include other devices 212, such as other inverters, DC to DC converters and the like, which may be supplied power from the electrical bus 108, and/or the power source bus 210.

The power source bus 210 may be coupled to an input of the DC to DC converter 206 such that the generator 106 supplies electrical power to the DC to DC converter 206 as at least part of the load on the power source bus 210. In addition to other device(s) 212, the power source bus 210 may also be coupled to other buses and/or loads, either via the power electronics 110, or directly. In an example configuration, the power source bus 210 may be a 700 volt AC bus or DC bus. The DC to DC converter 206 may be energized by power from the power source bus 210, and may output DC output power on a load bus 214. Accordingly, as a level of the DC output power changes due to load changes on the load bus 214, a loading level of the DC to DC converter 206 on the power source bus may correspondingly change.

The load bus 214 may be coupled with a load 216. The load 216 may be one of a plurality of loads included in the customer platform 118. The customer platform 118 may include other loads 218, which may, or may not, be supplied power from other device(s) 212 included in the power electronics 110. In an example, the load bus 214 may be 300 VDC bus with eighty-five percent to ninety-five percent of the load being a dynamically switched single device, and five percent to fifteen percent of the load being any of a number of devices representing a steady state load. The single device may represent a dynamic load demand creating a transient load ranging from, for example, zero percent to eighty-five to ninety-five percent of the total load of the load bus 214 with step changes in bus loading occurring over a time period of, for example, twenty milliseconds or less, such as vehicle electronics, a vehicle, an aircraft, a directed-energy weapon, a laser, a plasma weapon, a railgun, a microwave generator, a pulse-powered device or any other device that presents a step change transient load when applied to the load bus 214. The steady state load may represent, for example, five to fifteen percent of the total load on the load bus 214 may be a substantially constant bus load.

An energy storage device 220 may also be coupled with the load bus 214. The energy storage device 220 may be any form of device capable of storing and supplying DC power to the load bus 214. In an example, the energy storage device 220 may be one or more batteries, capacitors, super capacitors, fuel cells, or any other form of device or system capable of discharging DC power to the load bus 214 or any combination thereof. The energy storage device 220 may operate as a second source of DC electric power to maintain the voltage of the load bus 214, and cooperatively operate with the DC to DC converter 206 to supply power to the load 216.

The DC to DC converter 206 may be any type of electric or electromechanical device capable of converting a DC voltage from one voltage level to another voltage level. Conversion between voltage levels may be buck or boost, and may be performed by, for example, high frequency switching using stored energy. The DC to DC converter 206 may be, for example, a uni-directional switched mode converter. The magnitude of the voltage of the electric power supplied to the DC to DC converter 206 may be changed to a greater or lesser magnitude and output by the DC to DC converter 206 on the load bus 214.

The DC to DC converter 206 may be sized and rated to supply only 100% of the expected peak power needed by the load (total peak power supplied to transient load and steady state load) during substantially steady state conditions. Part of this stead state load may be the energy storage device when the energy storage device has been depleted. For example, following a step change load event when, under transient load conditions, both the DC to DC converter 206 and the energy storage device 220 have been supplying DC power to the load 216, the DC to DC converter 206 may adjust the DC output power to not only supply 100 percent of the load 216, but also re-charge the depleted energy storage device 220.

The level of DC output power output by the DC to DC converter 206 may be controlled by a controller 224. An output current of the DC to DC converter 206 may be dynamically controlled by adjusting a demand output of the DC to DC converter 206 with the controller 224. For example, the controller 224 may dynamically provide a selectively varied demand output signal representing a desired DC demand output of the DC to DC converter 206 on the load bus 214. Alternatively, or in addition, the controller 224 may directly and dynamically control the demand output of the DC to DC converter 206 to supply power to the load 216. The controller 224 and the DC to DC converter 206 may cooperatively operate to supply the load 216.

The DC to DC converter 206 may be in communication with a controller 224 over a communication bus 226. The controller 224 may also optionally be in communication over the communication bus 226 with the gas turbine 200, the turbine controller 202, the generator 106, AC-DC inverter 208 and/or the energy storage device 220. Alternatively, or in addition, the controller 224 may be in separate communication with any one or more of these devices. The controller 224 may include a processor and/or other device capable of performing logic, and a memory. The processor and/or memory may be included in the DC to DC converter 206, or any other device, or may be a standalone device. Any of the functionality described herein may be performed or directed by or as a result of the controller 224, except the functionality of the turbine controller 202. Alternatively, in other examples, the controller 224 and the turbine controller 202 may be combined. Such a combination may use multivariable control techniques to perform the functionality described herein. The memory may be a storage medium that is other than transitory, and stores instructions executable by the processor and/or other device, and data.

The controller 224 may operate to control the demand output of the DC to DC converter 206 using a sensor 230 to manage the DC output power of the DC to DC converter. The sensor may be a current sensor 230, such as a current transformer, or other form of transducer providing an output signal to the controller 224 indicative of the actual sensed current on the load bus 214. This sensor may also be included as part of the DC to DC Converter 206 such that the sensor is read and processed by an independent controller incorporated within the DC to DC Converter 206 and communicated to the Controller 224 via the communication bus 226. The controller 224 may also receive other operational parameters, such as ambient air temperature; an ambient air pressure; an elevation above sea level; an operational temperature of the gas turbine 102; an actual rotational speed of the gas turbine 102; a vibration level of the gas turbine 102; a sensed voltage on the power source bus 210; voltage on the load bus 214; stored energy level of the energy storage device 220; a rotation speed of the gas turbine 102; electric power output of the generator 106 and other parameters that may be used in controlling the demand output of the DC to DC converter voltage on the load bus 214. In addition, the controller 224 may communicate with other devices, such as the turbine controller 202 (or any of the other devices included in the system 100) to obtain operational parameters, or instructions. Instructions received by the controller 224 may include a set point, such as a set point of the demand output of the DC to DC converter 206, a set point of a current output of the DC to DC converter 206, or any other information the controller 224 may use to control the output power of the DC to DC converter 206. Further, where the system is included in an aircraft, the controller 224 may receive operational parameters such as a measured airspeed of the aircraft and a measured altitude of the aircraft.

The system may also optionally include a predictive model system 228. The predictive model system 228 may include a controller or other device or mechanism or device for executing logic, and a data storage, such as a non-transitory memory. In an example, the predictive model system 228 may be a separate device or system. Alternatively, the predictive model system 228 may be included in another device, such as the controller 202 or the controller 224 or any other device. The predictive model system 228 may perform analysis and forecast present conditions and future events. For example, the predictive model system 228 may perform predictive health modeling of different devices in the system to ascertain, for example, performance, capabilities and/or reliability. Such predictive modeling may be based on operational parameters received from the different systems and/or devices. Operational parameters may include temperatures, pressures, flow rates, vibration levels, hours of operation, diagnostic test results, historical operating trends, and the like. Based on such parameters, the operational health of the gas turbine 102, such as response times, torque limits, operational limits, and other such characteristics, the operational health of the DC to DC converter 206, such power output capabilities and the like, and operational health of the energy storage device, such as power output capability, power output projected duration, and the like may be estimated. Operational health of other devices in the system may also be determined. The results of the predictive analysis may be provided to devices such as the turbine controller 202 and the controller 224 for use in controlling respective systems and devices.

The controller 224 may also receive a transient load control signal on a control signal line 232. The transient load control signal may be an advisory signal, or anticipatory signal, or a feed forward signal, that is indicative of a load event prior to a step change in the transient load. In an example, the transient load control signal may be provided a predetermined time period ahead of the load event, or may provide a time when the load event will occur as part of the signal. In addition, the transient load control signal may provide a magnitude of the load, and/or a duration of how long the load event will continue. The transient load control signal may provide information as to the number of load events scheduled to be executed. The control signal may be provided by an external trigger such as another controller, a signal provided from the transient load, operation of a contact closure, or any other source capable of providing an indication of an anticipate load event prior to the load event actually occurring. The load event, such as a step change by the transient load, may occur after the controller 224 has received and reacted to the transient load control signal. Thus, the controller 224 may monitor for a control signal indicative of an imminent step change in the transient load. The imminent step change in the load may, for example, be greater than an eighty-five percent change in the load on the load bus 214, and occurring in a period of time of twenty milliseconds or less.

The controller 224 may control the DC to DC converter 206 as a load on power source bus 210 based on corresponding operation of the gas turbine 102. In one control scenario, the system may use the temperature of the gas turbine 102 to control operation of the DC to DC converter 206. In another control scenario the system may use the speed of the gas turbine 102 to control operation of the DC to DC converter 206. In still another control scenario, the system may use the anticipated torque output of the gas turbine 102 to control operation of the DC to DC converter 206. The different control scenarios may be used independently in the system 100 or two or more of the control scenarios may independently operate in a parallel in the system. In scenarios where multiple of the control scenarios are deployed in a single system, the system may implement the different scenarios deployed in a way that avoids conflicts, such as by hierarchically ranking the operational importance of each of the systems.

Gas Turbine Temperature Control Scenario

In an example of step-change loading of the integrated power and thermal management systems (IPTMS) 100, application of a transient step change load to the generator 106 may cause the gas turbine 102 to run to temperatures beyond those desired for the specific application. Such a scenario may be observed during a relatively long durations of powering the step change load (long pulse load). During a relative short-duration of powering the step change load (short pulse load), the step change load may be applied and then removed before engine temperature can rise sufficiently to an over temperature condition of the gas turbine 102. Such an over temperature condition may reach a first predetermined threshold that drives a maintenance action. At a second predetermined threshold, the over temperature condition may reach a control limit where the system, such as the turbine controller 202 may take action to limit the gas turbine output. The first threshold limit may be independent of the second threshold limit designed into the control for the gas turbine 102. For example, the turbine controller 202 when performing fuel control in a first operational scenario, such as in an emergency mode, may control gas turbine operation to allow operation into temperature ranges above the first threshold that drive maintenance actions, whereas in a different operational control scenario, such as in a normal mode, the turbine controller 202 may control gas turbine operation to stay within lower limits and avoid the maintenance action.

In the turbine temperature control scenario, the controller 224 may perform a method of limiting engine temperature, which reduces the level of load on the prime mover gas turbine 102 by adjusting a demand output of the DC to DC converter 206. Unlike current technology which relies on "load shedding" techniques to selectively disable or reduce the overall load, in this control scenario the controller 224 may reduce the demand output of the DC to DC converter 206 in order to reduce the load on the power source bus 210, and thereby reduce the loading of the gas turbine for a time and to a level sufficient to maintain or reduce engine temperature.

The controller 224 may operate a closed-loop dynamic control using a sensed temperature of the gas turbine 102, such as a measured temperature at the turbine, to a desired set point temperature threshold value, which results in an adjustment in the demand output of the DC to DC converter 206 that correspondingly adjusts the loading of the gas turbine 102. The sensed temperature may be provided from a temperature sensor 234 positioned in the gas turbine 102. For example, the temperature sensor 234 may be positioned between two turbines in the gas turbine 102 to measure a mean gas temperature. The measured temperature signal provided from the temperature sensor 234 to the controller 224 may or may not have lead compensation applied to counteract lag in the temperature measurement system. The controller 224 may compensate adjustment of the demand output of the DC to DC converter 206 by at least a first-order control loop in order to prevent steady-state errors. In addition, the controller 224 may limit the compensated adjustment in the demand output to a predetermined range.

In addition, or alternatively, the controller 224 may provide a calculated adjustment to the demand output in response to a temperate exceedance event of the predetermined threshold temperature, such as step change load event. One or more calculated adjustments of the current demand output, may be established for use during various operating conditions of the gas turbine 102 where prior analysis or experience has shown that a desired temperature threshold will be exceeded. For example, a table may be used to determine which of a number of different predetermined calculated adjustments to the demand output, or demand output adjustment values, may be selectively applied based on current operating conditions of the gas turbine 102. For example, the table may include information to calculate different adjustments to the demand output, where different adjustments may be calculated/selected based on ambient temperature, ambient pressure or altitude, or other operational parameters. Thus, the controller 224 may access the table based on the operational parameters to calculate and adjustment to the demand output for the current operating conditions. The expected duration and magnitude of the step change in the load, further temperature considerations, or other operational parameters may also be considerations in whether to apply the calculated adjustment to the demand output. One or both of the compensated adjustment and the calculated adjustment of the demand output of the DC to DC converter 224 may be applied to adjust the demand output.

During operation, the controller 224 may, for example, dynamically adjust the demand output of the DC to DC converter 206 lower in proportion to a duration of time that the temperature of the gas turbine 102 exceeds a predetermined threshold temperature value. For example, the controller may only lower the output of electric power by the DC to DC converter in response to the temperature of the gas in the gas turbine 102 being above the temperature threshold for a predetermined length of time. In another example, the controller 224 may dynamically adjust the demand output of the DC to DC converter lower in proportion to a difference between the operational temperature of the gas turbine and the predetermined threshold temperature value. In addition, or alternatively, the controller may dynamically adjust the demand output to a predetermined lower demand output.

The controller 224 may also adjust the predetermined threshold temperature in response to operating conditions to compensate the demand output of the DC to DC converter 224 accordingly. For example, the controller 224 may receive operational parameters that include an ambient temperature, an ambient pressure, a measured altitude and a measured air speed. The controller 224 may adjust the predetermined threshold temperature as a function of the ambient temperature and the ambient pressure. In addition, the controller 224 may dynamically adjust the output of the DC to DC converter 206 in response to at least one of the operational parameters or the operational temperature of the gas turbine 102 exceeding a predetermined threshold temperature value for the predetermined period of time. Further, the controller 224 may dynamically adjust a level of the demand output of the DC to DC converter 206 in accordance with a duration of time the operational temperature exceeds the predetermined threshold. For example, the demand output may be proportionally adjusted to the level the temperature exceeds the predetermined threshold.

The controller 224 may also preemptively adjust the demand output in response to receipt of the transient load control signal on the control signal line 232. The transient load control signal may indicate a magnitude and duration of the load event prior to occurrence of the load event causing a change in the loading of the load bus 214. The controller 224 may dynamically adjust the demand output of the DC to DC converter, such as by a predetermined amount in view of operational parameters such as the ambient conditions and the expected magnitude and duration of the load event to avoid or minimize an over temperature condition. Other operational parameters, including the health of the gas turbine 102, the DC to DC converter 206 and/or the energy storage device 220 may also be accounted for in the dynamic adjustment of the demand output. Further, the expected duration of the load event may be a consideration in the dynamic adjustment of the demand output. For example, the controller 224 may only dynamically adjust the demand output in response to the indicated duration of the load event being greater than a predetermined period of time. The upcoming load event may be a step change in load of greater than 90% of the rated output of the DC to DC converter 206, and the step change in load may take place in a time period of twenty milliseconds or less.

Figure 3:
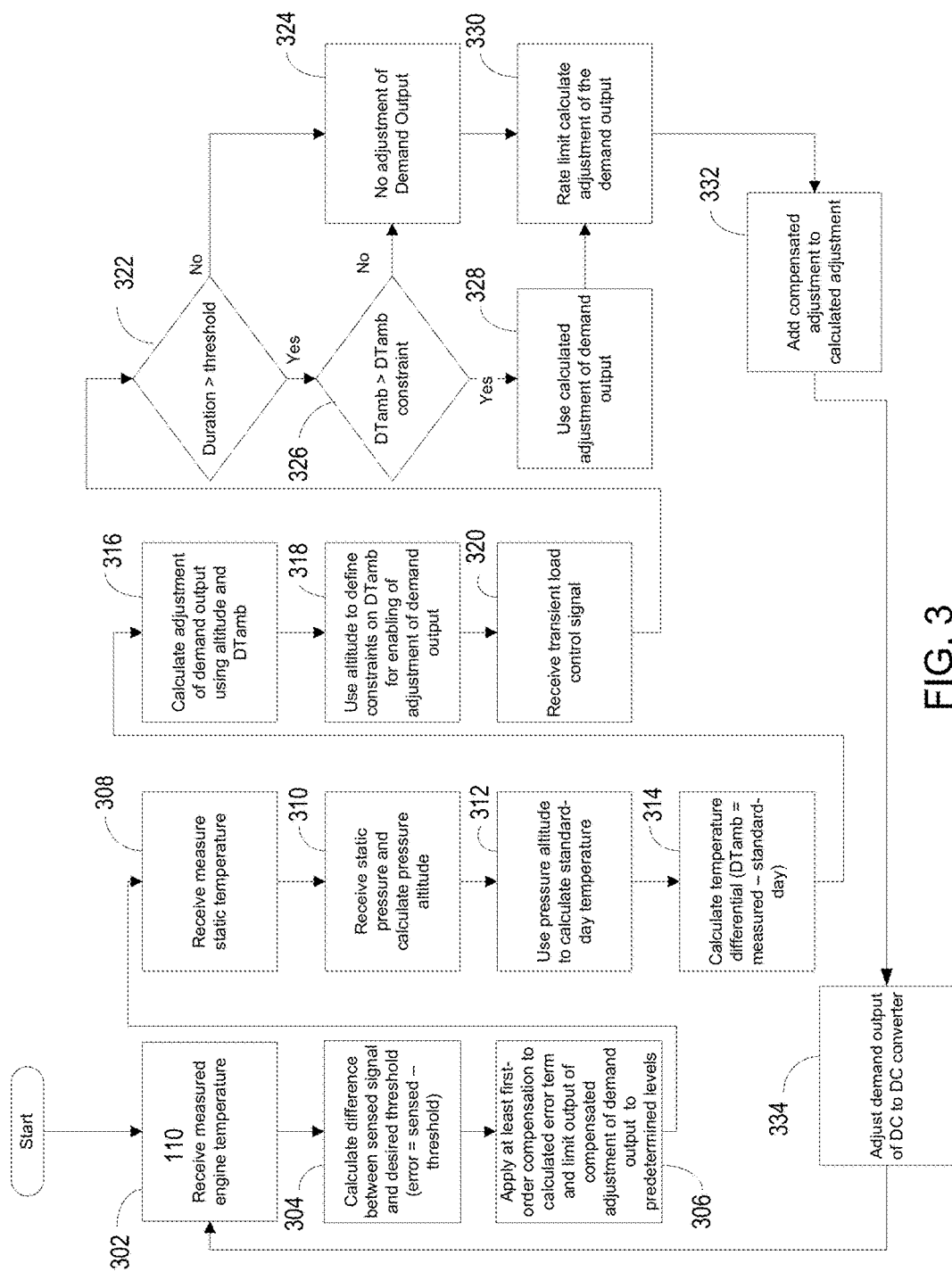
FIG. 3 is an operational block diagram illustrating example operation of the system performing gas turbine temperature control.

FIG. 3 is an operational block diagram illustrating example operation of the system performing gas turbine temperature control. In the illustrated example, protection against excessive temperatures using both dynamic compensation on measured temperature and default derate levels is illustrated. Thus, the illustrated operations incorporate dynamic adjustment to limit temperature of the turbine engine along with scheduled default values.

Referring to FIGS. 2 and 3, the controller 224 may receive the measured engine temperature of the gas turbine 102 from the temperature sensor 234. (302) The measured engine temperature may be compensated as needed to remove lag caused by the measurement system. The controller 224 may calculate the difference or error between the sensed temperature signal and a desired temperate threshold signal. (304) At least first order compensation may be applied to the calculated error term and, the output of the compensation in the form of a compensated adjustment to the demand output of the DC to DC converter 206 may be limited to a predetermined level. (306) The compensation may be an adjustment of the demand output of the DC to DC converter 206, and the predetermined levels may be determined based on the impact the change in demand output of the DC to DC converter 224 has on the temperature of the gas turbine 102. For example, the impact on reducing the mean gas temperature in the gas turbine 102 may be determined by testing, modeling, or calculation. Limiting the compensated adjustment in the demand output may be based on load conditions, gas turbine health, energy storage device health or state of charge, DC to DC converter health, and the like.

The controller 224 may receive the measured static temperature. (308) The controller 224 may also receive the static pressure and calculate pressure altitude. (310) The pressure altitude may be used to calculate the standard day temperature pursuant to International Counsel on Aeronautics (ICOA) standards. (312) A temperature differential (DTamb) may be calculated by subtracting the standard day temperature form the measured static temperature. (314) The adjustment of the demand output may be calculated using the altitude and the calculated temperature differential (DTamb). (316) The calculated pressure altitude may be used to define constraints for the desired calculated temperature differential (DTamb) to enable adjustment of demand output of DC to DC converter 206. (318) Alternatively, the adjustment of the demand output may be determined from a table using operational parameters.

The controller 224 may receive the transient load control signal that includes a duration and magnitude of the expected load event. (320) The controller 224 may determine if the duration of the load event is greater than a threshold predetermined period of time. (322) The predetermined threshold period of time may be, for example, ten seconds. If the duration is not greater than the predetermined period of time, the controller 224 makes no adjustment in the demand output of the DC to DC converter 206. (324) If the duration of the transient load step change is greater than the threshold, the controller 224 may next check if the calculated temperature differential (DTamb) is greater than a predetermined DTamb constraint. (326) The predetermined DTamb constraint may be, for example, determined from a table of ambient conditions to confirm that adjustment of the demand output is needed under the present ambient conditions.

If calculated temperature differential (DTamb) is not greater than the predetermined DTamb constraint, than the controller makes no adjustment to the demand output. (324) If the calculated temperature differential (DTamb) is greater than the predetermined DTamb constraint, than the calculated adjustment of the demand output of the DC to DC converter 224 is used. (328) The calculated adjustment of the demand output may be rate limited. (330) Rate limiting may be based on load conditions, gas turbine health, energy storage device health, DC to DC converter health, gas turbine actual speed, and/or any other operational parameters. The calculated adjustment and the compensated adjustment may be added by the controller 224 to obtain an adjustment of the demand output. (332) The controller may adjust the demand output of the DC to DC converter 206 based on the adjustment to the demand output. (334)

Gas Turbine Speed Control Scenario

Referring again to FIG. 2, in another example of step-change loading of the integrated power and thermal management systems (IPTMS) 100, application of a transient step change load to the generator 106 may cause the gas turbine 102 to decrease to levels unsuitable for the intended power generation purpose, or to fail to accelerate under load, thus potentially driving the gas turbine engine 102 into undesirable "no run" zones. Such no run zones are ranges of rotational speed in which it is desirable for the gas turbine 102 to accelerate or decelerate through without operating in that range of rotational speed for an extended period of time. A range of rotational speed considered as a "no run" zone may be, for example between 75% and 85% of full load rated constant speed of the gas turbine 102. The decrease in rotational speed of the gas turbine 102 during a load event may be independent of the limits designed into the control for the gas turbine engine 102. For example, the minimum rotational speed of the gas turbine to drive the generator 106 may be acceptable for normal engine operation, but may be below the speed required by the power generation system.

In the turbine speed control scenario, the controller 224 may perform a method of manipulating engine speed which reduces the level of load on the gas turbine 102 by adjusting the output current of the DC to DC converter 206. Unlike current technology which relies on "load shedding" techniques to selectively disable the overall load when this condition is encountered, in this control scenario the controller 224 may control the output current of the DC to DC converter 206 in order to reduce the load on the power source bus 210, and thereby reduce the loading of the gas turbine 102 for a time and to a level sufficient to allow the engine's control system to respond and restore engine to the rated constant speed.

The turbine controller 202 may provide speed governing of the gas turbine 102 as a primary mode of engine control to maintain the gas turbine 102 at a substantially constant rated speed and a variable torque. A predetermined threshold may be used to define a trigger speed of the gas turbine 102, below which load is reduced. After the gas turbine 102 is running at substantially a constant rated speed, such as running at a constant speed so as to prevent tripping logic from executing when a load is added (such as when an engine is started), the controller 224 may receive a signal indicative of a shaft speed of the gas turbine 102. The speed signal may be provided as an actual turbine speed from a speed sensor 236 included in the gas turbine 102. The controller 224 may monitor the actual speed of the gas turbine 102, and may selectively control the output current of the DC to DC converter 204 based on deviation of the actual speed of the gas turbine 102 from the constant rated speed.

The controller 224 may trigger an adjustment in the output electrical current set point of the DC to DC converter 206 when the actual speed of the gas turbine 102 drops below the trigger speed. The amount of adjustment in the output electrical current set point applied by the controller 224 may be based on operational parameters related to the speed deviation event. For example, the amount of adjustment in the output electrical current set point may be based on the period of time spent below a predetermined threshold. In addition, or alternatively, the amount of adjustment in the output electrical current set point may be based on how far below threshold the speed of the gas turbine 102 droops and/or based on a combination of speed and acceleration of the gas turbine 102. The adjustment of the output electrical current set point may be, for example, proportional to time spent outside a predetermined threshold. In addition, or alternatively, adjustment of the output electrical current set point may be, for example, based on a ratio or percentage deviation outside the predetermined threshold.

The controller 224 may apply limits to the allowed amount of adjustment in the output electrical current set point. For example, the limits may include a time delay from when speed droops below the predetermined threshold until the output electrical current set point is adjusted, and/or a minimum level to which the output electrical current set point may be adjusted, such as providing a predetermined range within which the set point may be changed. In addition, or alternatively, minimum and maximum set point values may be used, so as to avoid driving the actual speed of the gas turbine 102 above or below a desired speed range (i.e. can this function drive the load to zero?). In another example, the controller 224 may include rate limits regarding how quickly the output electrical current set point of the DC to DC converter 206 may be adjusted, such as limiting the change in set point to a percent per second change. Thus, the limits may limit a magnitude in the change of the output electrical current set point and/or limit a rate at which the output electrical current set point is applied or removed. Accordingly, the actual rate of adjustment of the output electrical current set point may be independent from a requested adjustment of the output electrical current.

During operation, the controller 224 may control the output current of the DC to DC converter 206 to supply the load on the load bus. The output current of the DC to DC converter 206 may be controlled by the controller 224 based on deviation of the actual speed of the gas turbine 102 from the constant rated speed. For example, the controller 224 may identify a decrease in the speed of the gas turbine 102 from the constant rated speed, and dynamically lower an electric current set point of the DC to DC converter 206 at a predetermined rate of change to ramp the actual speed of the gas turbine 102 back to the constant rated speed. In another example, the controller 224 may identify the speed of the gas turbine 102 as having returned to the constant rated speed, and the controller may dynamically raise the electric current set point of the DC to DC converter 206 at a predetermined rate of change that maintains the gas turbine 102 at the constant rated speed.

The controller 224 may also dynamically set a target electric current set point of the DC to DC converter 206. The target electric current set point may be dynamically set based on a duration of the deviation of the actual speed of the gas turbine 102 from the constant rated speed, based on a magnitude of the deviation of the actual speed of the gas turbine from the constant rated speed, or based on both a magnitude of the deviation of the actual speed of the gas turbine from the constant rated speed and a duration of the deviation of the actual speed of the gas turbine from the constant rated speed. In another example, the controller 224 may dynamically set a target electric current set point of the DC to DC converter based on a magnitude of the deviation of the actual speed of the gas turbine from the constant rated speed and a direction of acceleration of the actual speed of the gas turbine. In still another example, the controller 224 may determine a period of time that the actual speed of the gas turbine 102 is below a predetermined threshold, and adjust the output electrical current set point of the DC to DC converter lower only after the deviation of actual speed of the gas turbine 102 is below the predetermined threshold for longer than a predetermined period of time.

The controller 224 may dynamically limit or otherwise control a rate of change of the output current of the DC to DC converter. For example, the controller 224 may adjust the output electrical current set point of the DC to DC converter 206 lower at a rate of change to return the actual speed of the gas turbine 102 to the constant rated speed of the gas turbine 102. In addition, the controller 234 may dynamically adjust the output electrical current set point of the DC to DC converter 206 higher at said rate of change in response to the actual speed of the gas turbine 102 being greater than the rated constant speed of the gas turbine 102. The magnitude or level of the step change of the set point dynamically selected by the controller may correspond to the length of the time period the speed of the gas turbine 102 is outside the predetermined threshold, the level of deviation of the speed outside the threshold, or the combination. In addition, the controller may take into account operational parameters, such as ambient temperature, ambient pressure, operational parameters of the gas turbine 102, operational parameters of the DC to DC converter 204, operational parameters of the energy storage device 220, the health of the gas turbine 102, the health of the DC to DC converter 204, the health of the energy storage device 220, or any other factors that may impact the rate of change of the output electrical current set point.

The adjustment of the set point of the electrical current set point by the controller 224 may be a continuously varying set point value. Alternatively, or in addition, the controller 224 may output a step change value in the output electrical current set point of the DC to DC converter 206. The step change may adjust the output electrical current set point of the DC to DC converter 206 lower by a step change amount to a predetermined lower set point to increase the actual speed of the gas turbine 102 to the constant rated speed of the gas turbine 102. In addition, the controller 234 may adjust the output electrical current set point of the DC to DC converter 206 higher by the step change to return the output electrical current set point of the DC to DC converter 206 to a previous value in response to the actual speed of the gas turbine 102 being the rated constant speed of the gas turbine 102. The step change amount may be determined by the controller 224 dynamically based on deviation of the actual speed, duration of deviation, and/or may include consideration of other operational parameters. For example, the controller 224 may access a table of predetermined step change values to determine the appropriate step change level for the particular operational conditions and/or speed deviation.

The turbine controller 202 may operate as a first controller to control the gas turbine 102 to a constant rated rotational speed. The controller 224 may separately and independently operate as a second controller to control the DC to DC converter 206 by receiving a signal indicative of the actual speed of the gas turbine 102, and adjusting the output electrical current set point of the DC to DC converter 206 to compensate for deviation of the actual speed from the constant rated speed of the gas turbine 102. Accordingly, the turbine controller 202 and the controller 224 are cooperative operable to maintain the gas turbine 102 at the constant rated speed of the gas turbine. In this regard, the controller 224 may limit the rate of change of the output electrical current set point of the DC to DC converter 206 in accordance with a response time of the turbine controller 202. Thus, the controller 224 may adjust the output electrical current set point of the DC to DC converter 206 lower at a rate of change to cooperatively operate with the turbine controller 202 to return the actual speed of the gas turbine 102 to the constant rated speed of the gas turbine 102. In addition, controller 224 may adjust the output electrical current set point of the DC to DC converter 206 higher at said rate of change in response to the actual speed of the gas turbine 102 being the rated constant speed of the gas turbine 102. In this way, the controller 224 may compliment and effectively optimize the efficiency of control of the engine speed by the turbine controller 202.

The controller 224 may also control the DC to DC converter 206 based on receipt of the transient load control signal received by the controller 224 over the control line 232. After receipt of the transient load control signal, which may include a duration and magnitude of an upcoming transient step change load, the controller 224 may adjust the output electrical current set point of the DC to DC converter 206 in response to receipt of the signal. The controller 224 may only adjust the output electrical current set point of the DC to DC controller 206 in response to the duration of the upcoming load event provided in the signal being greater than a predetermined threshold. The predetermined threshold may be a period of time that causes the actual speed of the gas turbine 102 to deviate from the constant rated speed. In an example, the upcoming load event may be a step change in load of greater than 90% of the rated output of the DC to DC converter 206, and the step change in load may take place in a time period of twenty milliseconds or less.

Figure 4:
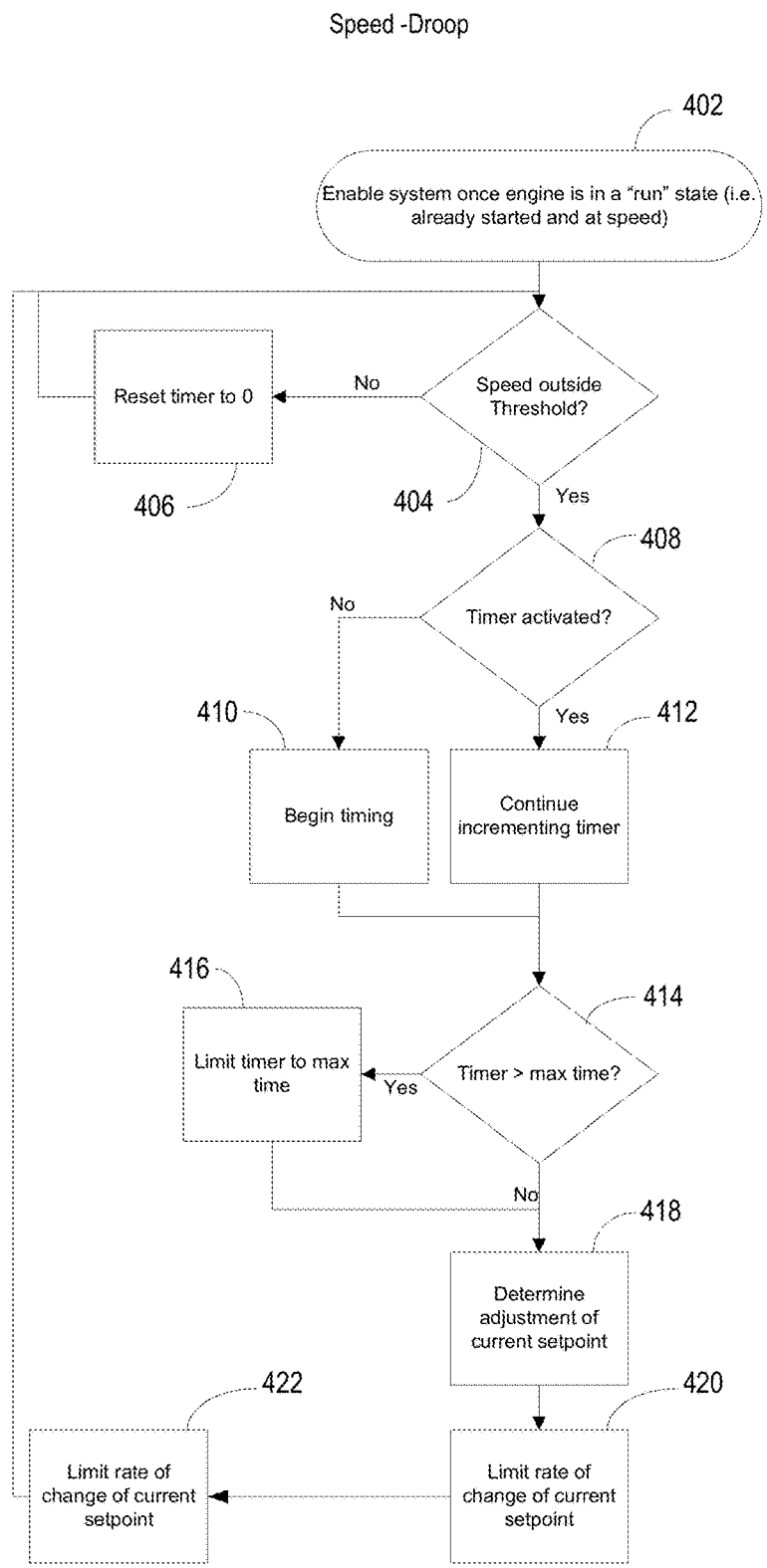
FIG. 4 is an operational flow diagram illustrating example operation of the system performing gas turbine speed control.

FIG. 4 is an operational flow diagram illustrating example operation of the system performing gas turbine speed control. Referring to FIGS. 2 and 4, in this example, the system may prevent undesired operation of the gas turbine 102 below a threshold rotational speed within a no dwell zone. For example, the system 100 may protect against prolonged operation of the gas turbine engine 102 below a no dwell threshold. The operation begins when the gas turbine 102 is in a run state where it is already started and being controlled at constant speed and variable torque. (402) It is determined by the controller 224 if the rotational speed of the gas turbine 102 is outside a predetermined speed threshold, or speed range based on an actual speed signal of the gas turbine received by the controller 224. (404) In an example, the predetermined speed threshold may be a threshold percentage of the rated constant speed of the gas turbine 102, such as 85%. In other examples, the predetermined speed threshold may be a predetermined speed range surrounding the rated constant speed of the gas turbine 102, such as +/−10% of rated speed. If the speed is not outside the predetermined threshold speed, such as operating above 85% of the rated constant speed, a timer should be reset to zero (406), and the operation should return to the determination of whether the speed is greater than the threshold. (404) The timer may provide a period of time, such as 10 ms, between comparisons of the actual speed of the gas turbine 102 to the threshold. The timer may be implemented with the controller, or may be a separate device.

If the speed is greater than the threshold, the controller checks if a threshold timer is activated and timing to track the period of time the speed is outside the threshold. (408) The threshold timer may be implemented with the controller, or may be a separate device. If the threshold timer is not activated, the threshold timer is activated and begins timing from zero or some other predetermined value. (410) If the threshold timer is activated, then timer continues to increment during the time the actual speed is outside the predetermined threshold. (412) The controller determines if the threshold timer has reached a maximum time. (414) The maximum time may provide numeric overflow protection of the threshold time in the event the actual speed is outside the predetermined threshold for an extended period. Alternatively, or in addition, additional control actions, annunciation or other actions may be taken if the maximum time is reached. If the threshold timer has reached the maximum time, the timer may be limited to the maximum time, by, for example, logging the maximum time and resetting, and/or starting a different timer. (416)

If the threshold timer has or has not reached the maximum time, the controller determines an adjustment of the electric current set point of the DC to DC converter. (418) The adjustment of the electric current set point generated by the controller 224 may be continuous or may be a step change, or some combination of continuous and step change. In addition, the magnitude and rate of change of the adjustment of the set point may be determined by the controller 224 based on the actual speed of the gas turbine 102 and the time the actual speed is outside the predetermined threshold, as well as other operational parameters. The level and rate of adjustment of the electric current set point may also be limited by the controller 224. (420) The DC to DC convertor 204 may be controlled by the controller 224 to output DC current on the load bus 214 based on the electric current set point. (422)

Gas Turbine Torque Control Scenario

Referring again to FIG. 2, in another example of step-change loading of the integrated power and thermal management systems (IPTMS) 100, excessive torque may be placed on the gas turbine 102 if the application of load to the generator 106 is of sufficient magnitude, duration and/or rate. For a given level of load, relatively short-duration transient step change loads do not necessarily present an issue for the response of the turbine controller 202 and the gas turbine 102 since the step change load is removed quickly enough to minimize impactful operation. Relatively long duration of transient step change loads may cause the engine output shaft speed to droop due to the increased load on the generator 106, which the turbine controller 202 may attempt to compensate for by increasing fuel flow to the gas turbine 102. This may create excessive torque output on the output from the gas turbine 102 which may exceed desired torque output limits. These limits may be independent of the limits designed into the control for gas turbine engine 102 and/or the system 100. If a mechanism for reducing the step change transient load based on sensing the torque measurement is applied, the turbine controller 202 may not be fast enough to prevent further increases in engine torque or else the step change load may be unnecessarily restricted in magnitude or rate of application.

In the turbine torque control scenario, the controller 224 may perform a method of limiting engine torque, which reduces the ramp rate of load application by reducing the DC output power of a downstream device (e.g. DC-DC Converter 204). As noted, reduction in the DC output power may not be effective while the transient step change load is underway, and instead a constraint on a rate of change of the level of the DC output power of the DC to DC converter 204 may be enabled based on information received by the controller 224 indicating an anticipated future occurrence of the transient step change load. The information may include an indication of the duration of the step change load event and a time when the step change load will be applied. The time between when the indication is provided and when the transient step change load is applied may be negotiated or evaluated via simulation. In some examples, the constraint on the rate of change of DC output power may only be applied to an anticipated step change increase in load. In other examples the constraint on the rate of change of DC output power may be applied to an anticipated step change increase in load or an anticipated step change decrease in load.

The constraint on the rate of change of the output of the DC to DC converter 204 may be based on the duration of an anticipated upcoming step change load event, but may also be driven based on other parameters such as altitude (pressure), temperature, gas turbine engine health, or other considerations. The constraint on the rate of change of the output may be a limiting load ramp rate value calculated by the controller 224 based on operational parameters such as ambient pressure and temperature, but may also be based on other operational parameters or factors. The presence and availability of the energy storage device 220 on the load bus 214 may allow the load ramp rate on the gas turbine engine 102 to be adjusted without altering the system's 110 ability to satisfy the full load on the load bus 214 because the portion of the load not supplied based on the gas turbine engine 102 may be supplied by energy storage device 220.

The controller 224 may determine if the projected duration of the anticipated step change load step warrants constraining the rate of change of the DC output power of the DC to DC converter 204. In addition, multiple other factors may be considered by the controller 224 as part of this calculation. For example, the projected magnitude of the anticipated step change load, the heath of the gas turbine engine 102, and/or ambient conditions which may affect the operability of the gas turbine 102 to attain certain operation performance may be considered. In an example, the projected magnitude of the anticipate load change may be fixed and substantially repeatable each time the transient load step change is applied. In another example, the projected magnitude of the anticipate step change load step may be variable and may form the basis for not only a determination of whether the rate of change of the DC output power should be constrained or not, but also the level of constraint that is necessary based on the projected magnitude.

In addition, the controller 224 may calculate an appropriate load ramp rate of the DC to DC converter 206 based on the load application. Constraint of the rate of change of the level of the DC output power may be calculated by the controller 224 based on system analysis and other possibly competing factors such as minimizing usage of the electrical energy storage device (depletion) and minimizing the impact of the rapid load application to the engine. Calculation of the load ramp rate may involve multiple factors, such as operational parameters, which may include measured altitude, measured pressure and/or measured temperature. Calculation of the load ramp rate may be performed dynamically by the controller 224. Alternatively, or in addition, a step change constraint of the load ramp rate may be determined by the controller 224, such as by accessing a table of predetermined step change constrain values, or load ramp rates, may be based on the anticipated transient step change event and other factors, such as operational parameters. The table of predetermined step change constraint values, or load ramp rates may be determined, for example, from prior analysis such as modeling or actual testing based on desired system operational goals. In addition, operational parameters, such as key operational parameters in view of desired system operational goals may be determined for use in the table, by, for example, such modeling and/or testing.

During example operation, the controller 224 may control a level of DC output power output by the DC to DC converter 204 on the load bus 214. The load bus may also be supplied DC power from the energy storage device 220. The controller 224 may receive the transient load control signal over the control signal line 232. In this example, the transient load control signal may indicate an anticipated future occurrence of a step change load event on the load bus 214. When the step change load event is subsequently received on the load bus (after receipt of the transient load control signal), the controller may adjust the level of the DC output power of the DC to DC converter in response to the step change load event. During the adjustment, the controller 224 may apply a constraint on a rate of change of the level of the DC output power of the DC to DC converter 204. Accordingly, although the load demand brought on by the step change transient load being applied to the load bus 214 is at a relatively high level which would require a relatively steep load ramp rate of the DC to DC converter 206, the controller 224 may lower the steepness of the load ramp rate by constraining the rate of change of the level of the DC output power. The controller 224 may apply the constraint based on the transient load control signal to maintain the variable torque of the gas turbine 102 below a predetermined threshold as a load ramp rate of the DC to DC converter changes on the power source bus 108 thereby affecting the load of the generator 106.

The transient load control signal may, for example, include an indication of a projected magnitude of the step change load event, and the controller 224 may vary constraint on the rate of change based on the projected magnitude of the step change load event. The controller 224 may constrain the rate of change of the level of the DC output power of the DC to DC converter when the projected magnitude of the step change load event is greater than a predetermined step change that is projected to cause the variable torque of the gas turbine 102 to exceed a predetermined amount. The upcoming load event may, for example, be a step change in load of greater than 90% of the rated output of the DC to DC converter 206, and the step change in load may take place in a time period of twenty milliseconds or less.

In another example, the transient load control signal may include an indication of a projected magnitude of the step change load event and a projected duration of the step change load event, and the controller 224 may vary the constraint on the rate of change based on the projected duration of the step change load event only when the projected magnitude of the step change load event is greater than a predetermined amount. The controller 224 may constrain the rate of change of the level of the DC output power of the DC to DC converter 204 when the projected duration is greater than a predetermined duration that causes the variable torque of the gas turbine 102 to exceed a predetermined amount due to the projected magnitude of the step change load event.

The transient load control signal may also, for example, include an indication of a time of receipt of the step change load event on the load bus 214, a duration of the step change load event, and a magnitude of the step change load event. In this example, the controller 224 may initiate application of the constraint on the rate of change at the indicated time of receipt of the step change load event, based on the duration of the step change load event and the magnitude of the step change load event. The controller 224 may also adjust application of the constraint based on a sensed operational parameter of the gas turbine. For example, the sensed operational parameter may include at least one of an engine temperature, an engine flow rate, an engine pressure, an engine torque, an engine vibration level or an engine speed. In addition, other system operational parameters such as the heath of the gas turbine, the health of the DC to DC converter, the health of the energy storage device, a level of energy stored in the energy storage device, the volatility of the load on the load bus 214 prior to the step change load event, and other factors affecting the torque requirements on the gas turbine 102 may also be used by the controller 224 in calculating the constraint on the rate of change. In addition, consideration of the direction of the step change load event may also be a consideration. For example, the controller 224 may apply the constraint only when the level of the DC output power is increasing.

The controller 224 may also cooperatively operate with the turbine controller 202 to avoid undesirable excessive torque on the gas turbine 102. The turbine controller 202 may control the gas turbine 102 to operate at a constant speed set point and a variable torque output so that the generator 106 rotatably coupled with the gas turbine 102 outputs electric power to the power source bus 210. The DC to DC converter 206 operates as a variable load on the power source bus 210 based on the load on the load bus 214 coupled with an output of the DC to DC converter 206. The load bus 214 may intermittently supply a transient step change load the controller 224 may control the DC output power of the DC to DC converter 206 to supply the load bus and intermittently supply the transient step change load.

Since the energy storage device 220 also supplies power to the load bus 214, the controller 224 may limit the rate of change of the DC output power of the DC to DC converter 206 during intermittent supply of the transient step change load without starving the step change load. Due to the rate of change of the output DC power being limited by the controller 224, the variable torque of the gas turbine 102 may be maintained below a predetermined threshold as a load ramp rate of the DC to DC converter 206 changes on the power source bus 210. Constraint of the load ramp rate of the DC to DC converter 206 may be effected by the controller 224 using the information from the transient load control signal received prior to the step change load event. The transient load control signal is anticipatory of application of the transient step change load to the load bus 214.

By the controller 224 constraining the load ramp rate of the DC to DC converter 206, a step change increase in load on the power source bus 210 is avoided, and correspondingly, the torque output of the gas turbine is maintained below excessive torque levels. Depending on the magnitude and duration of the step change load event, the output power of the DC to DC converter 206, and the corresponding load ramp rate of the DC to DC converter 206 may gradually and uniformly increase to supply the step change load. This gradual and uniform increase in load on the power source bus 210 may demand greater power output from the generator 106 and corresponding increased torque from the gas turbine 102, however, due to the gradual and uniform increase, the turbine controller 224 may maintain the ramp of the torque output of the gas turbine 106 below excessive levels. Accordingly, the constraint of the rate of the change of the DC output power of the DC to DC converter 206 may also be controlled by the controller 224 based on the control performance of the turbine controller 202 so as to avoid creating a condition under which the turbine controller 202 demands excessive output torque from the gas turbine 102.

Since the transient load control signal may provide an indication of a duration of the application of the transient step change load to the load bus, the controller 224 may limit the rate of change in response to the duration being greater than a predetermined period of time that would elicit unfavorable torque control action from the turbine controller 202, and not limit the rate of change in response to the duration being less than or equal to the predetermined period of time. The controller 224 may also receive a signal indicative of operational conditions of the gas turbine 102, such that the controller 224 may also account for the turbine controller 202 control operation under the operational conditions of the gas turbine 102, when adjusting the limit of the rate of change based on the operational condition. Accordingly, the controller 224 may cooperatively operate with the turbine controller 202 to present a load ramp rate of the DC to DC converter 206 on the power source bus 210 that avoids excessive torque conditions on the output of the gas turbine 102 under the operational conditions of the gas turbine 102. Such operational conditions of the gas turbine 102 may include at least one of a measured vibration, an air flow or a temperature of the gas turbine. In addition, the controller 224 may calculate the load ramp rate to limit the rate of change of the DC output power of the DC to DC converter 206 based on operational conditions such as a measured static temperature, a measured static pressure, a measure humidity, a measure altitude and other such parameters that may affect the operational control of the gas turbine 102 by the turbine controller 202.

Figure 5:
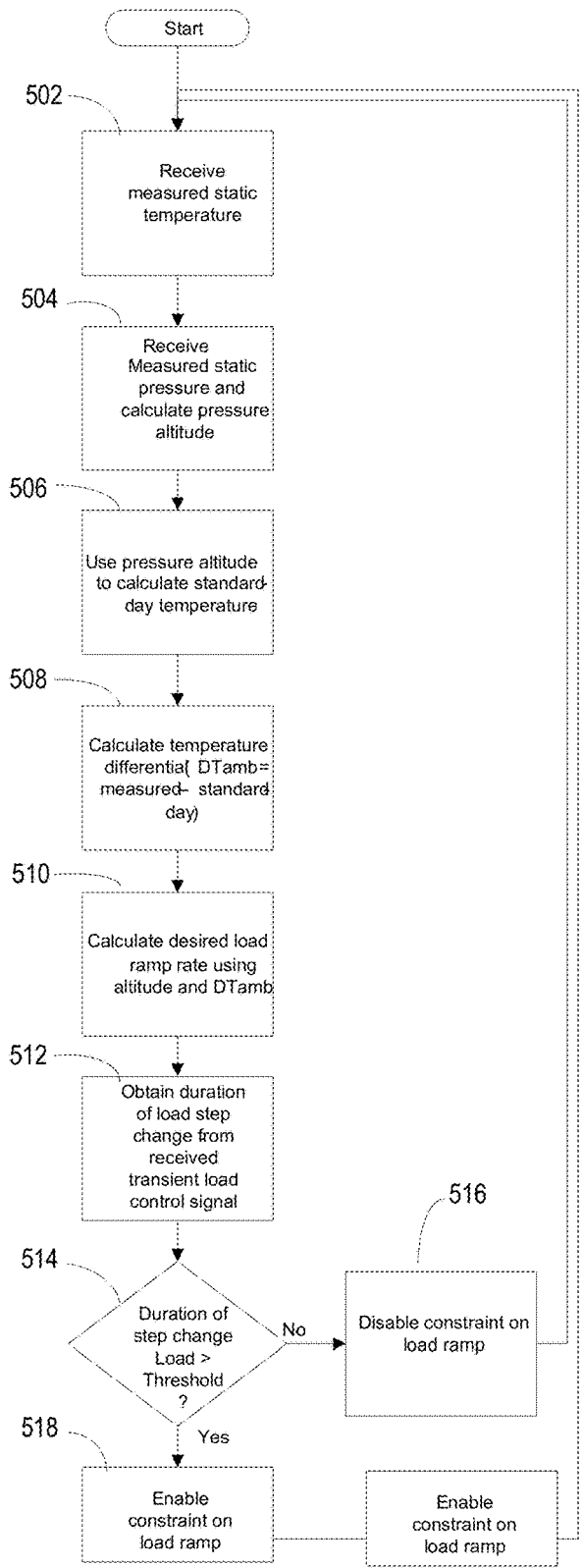
FIG. 5 is an operational flow diagram illustrating example operation of the system performing gas turbine torque control.

FIG. 5 is an operational flow diagram illustrating example operation of the system performing gas turbine torque control. Referring to FIGS. 2 and 5, in this example, the system 100 may be subject to a step change load event of a fixed magnitude with varying duration. Accordingly, the magnitude of the step change load event may be a constant when the controller is calculating the constraint on the rate of change of the level of the DC output power of the DC to DC converter 204. In this example, the constraint on the rate of change of the level of the DC output power may be calculated based on operational parameters.

The controller 224 may receive a measured static temperature, such as an ambient temperature in which the gas turbine is operating. (502) The controller 224 may also receive a measured static pressure and calculate a pressure altitude. (504) Using the calculated pressure altitude, the controller 224 may calculate standard day temperature pursuant to International Counsel on Aeronautics (ICOA) standards. (506) A temperature differential (DTamb) may be calculated by subtracting the standard day temperature from the measured static temperature. (508) The constraint on the rate of change of the DC output power of the DC to DC converter 206 may be calculated using the calculated altitude and the calculated temperature differential (DTamb). (510) In examples, the calculated pressure altitude may be used to define constraints for the desired calculated temperature differential (DTamb).

The controller 224 may receive the transient load control signal that includes a projected duration of the expected load event and further calculate the constraint on the rate of change of the level of the DC output power of the DC to DC converter 206. (512) In this example, the projected magnitude of the expected transient load step change is not used since the magnitude of the load step change is a fixed substantially constant predetermined value (such as within +/−10%). Also in this example, the constraint may be calculated using the calculated altitude and the calculated temperature differential (DTamb), however, in other examples, any other operational parameters, such as health of the engine, engine temperature, engine speed, energy presently stored in the energy storage device, or any other operational parameters may be used in calculation of the constrain. Moreover, in other examples, a predetermined constraint, or load ramp rate value may be obtained from a table using the expected duration and operational parameters, such as the calculated altitude and the calculated temperature differential (DTamb).

The controller 224 may determine if the expected duration of the anticipated step change load is greater than a predetermined threshold. (514) If not, the constraint on the load ramp rate may be disabled by not constraining the rate of change of the level of the DC output power of the DC to DC converter 206. (516) If the expected duration of the anticipate load step change is greater than the predetermined threshold, the constraint may be enabled to constrain the load ramp rate of the DC to DC converter 206 on the power supply bus 210 by constraining the rate of change of the level of the DC output power of the DC to DC converter 206. (518) The constraint of the load ramp rate may be applied before the step change load event occurs on the load bus 214, or at the time the step change load rate ramp is sensed on the load bus 214. If the constraint is applied before the load ramp rate occurs, the timing of the application may be based on the estimated time of the load event as provided in the transient load control signal.

Each component described herein may include additional, different, or fewer components. For example, the controller 224 may be multiple controllers, the energy storage device 220 may be multiple devices, or the DC to DC converter 206 may be multiple converters. In addition, the power system 110 may be implemented with additional, different, or fewer components. For example, the AC-DC inverter 208 and other devices 212 may be omitted or included. The logic described and illustrated in the flow diagrams may include additional, different, or fewer operations than described and/or illustrated to obtain similar functionality. In addition, the operations of the system described and illustrated herein, may be performed in a different order.

The methods, devices, processing, circuitry, and logic described above may be implemented in many different ways and in many different combinations of hardware and software. For example, although the gas turbine temperature control scenario, the gas turbine speed control scenario and the gas turbine torque control scenario are separately described, these scenarios are not mutually exclusive and may be implemented in cooperative operation. Thus, any combination of one, two or three of these control scenarios may be implemented in any grouping or configuration. Moreover, these control scenarios may be implemented in connection with and/or in cooperative operation with any other controls, such as the gas turbine controls, the energy storage device controls and the like.

Also for example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. In addition, the use of the article "a" in the claims is equivalent to "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method comprising:

controlling a gas turbine to rotate at a constant rated speed and a variable torque to drive a generator in accordance with a load being supplied by the generator;

outputting electric power with the generator to a power source bus;

energizing a DC to DC converter coupled to the power source bus as at least part of the load being supplied by the generator;

controlling a level of a DC output power output by the DC to DC converter on a load bus;

supplying the load bus with DC power supplied from an energy storage device;

receiving a transient load control signal indicative of an anticipated future occurrence of a step change load event on the load bus;

receiving the step change load event on the load bus after receipt of the transient load control signal;

adjusting the level of the DC output power of the DC to DC converter in response to the step change load event; and applying a constraint on a rate of change of the level of the DC output power of the DC to DC converter, the constraint applied based on the transient load signal to maintain the variable torque of the generator below a predetermined threshold as a load ramp rate of the DC to DC converter changes on the power source bus.

2. The method of aspect 1, wherein the transient load control signal comprises an indication of a projected magnitude of the step change load event, and wherein applying the constraint on the rate of change comprises varying the constraint on the rate of change based on the projected magnitude of the step change load event.

3. The method of aspect 2, wherein varying the constraint on the rate of change comprises constraining the rate of change of the level of the DC output power of the DC to DC converter when the projected magnitude of the step change load event is greater than a predetermined step change that is projected to cause the variable torque of the generator to exceed a predetermined amount.

4. The method as in any of aspects 1-3, wherein the transient load control signal comprises an indication of a projected magnitude of the step change load event and a projected duration of the step change load event, and wherein applying the constraint on the rate of change comprises varying the constraint on the rate of change based on the projected duration of the step change load event only when the projected magnitude of the step change load event is greater than a predetermined amount.

5. The method of aspect 4, wherein varying the constraint on the rate of change comprises constraining the rate of change of the level of the DC output power of the DC to DC converter when the projected duration is greater than a predetermined duration that causes the variable torque of the generator to exceed a predetermined amount due to the projected magnitude of the step change load event.

6. The method as in any of aspects 1-5, wherein receiving the transient load control signal comprises receiving an indication of a time of receipt of the step change load event, a duration of the step change load event, and a magnitude of the step change load event, wherein applying the constraint on the rate of change comprises initiating application of the constraint on the rate of change at the indicated time of receipt of the step change load event, based on the duration of the step change load event and the magnitude of the step change load event.

7. The method as in any of aspects 1-6, wherein applying a constraint on a rate of change of the level of the DC output power of the DC to DC converter comprises adjusting application of the constraint based on a sensed operational parameter of the gas turbine.

8. The method of aspect 7, wherein the sensed operational parameter comprises at least one of an engine temperature, an engine flow rate, an engine pressure, an engine torque, an engine vibration level or an engine speed.

9. The method as in any of aspects 1-8, wherein applying the constraint on the rate of change of the level of the DC output power of the DC to DC converter comprises applying the constraint only when the level of the DC output power is increasing.

10. A system comprising:

a gas turbine;

a first controller configured to control the gas turbine to operate at a constant speed set point and a variable torque output;

a generator rotatably coupled with the gas turbine and configured to output electric power to a power source bus;

a DC to DC converter operable as a load on the power source bus;

a load bus coupled with an output of the DC to DC converter, the load bus configured to intermittently supply a transient step change load;

a second controller configured to control a DC output power of the DC to DC converter to supply the load bus and intermittently supply the transient step change load; and an energy storage device configured to supply power to the load bus;

the second controller configured to limit a rate of change of the DC output power of the DC to DC converter during intermittent supply of the transient step change load subsequent to receipt of a transient load control signal, the transient load control signal anticipatory of application of the transient step change load to the load bus, the rate of change limited by the second controller to maintain variable torque of the gas turbine below a predetermined threshold as a load ramp rate of the DC to DC converter changes on the power source bus.

11. The system of aspect 10, wherein the transient load control signal comprises an indication of a projected duration of application of the transient step change load to the load bus, and the second controller is configured to limit the rate of change in response to the projected duration being greater than a predetermined period of time, and not limit the rate of change in response to the projected duration being less than or equal to the predetermined period of time.

12. The system of aspect 11, wherein the transient load control signal comprises an indication of a projected magnitude of application of the transient step change load to the load bus, and the second controller is configured to limit the rate of change in response to the projected magnitude being greater than a predetermined value, and not limit the rate of change in response to the projected magnitude being less than or equal to the predetermined value.

13. The system as in any of aspects 10-12, wherein the second controller is configured to receive a signal indicative of an operational condition of the gas turbine, the second controller further configured to adjust the limit of the rate of change based on the operational condition.

14. The system of aspect 13, wherein the operational condition is at least one of a vibration, an air flow or a temperature of the gas turbine.

15. The system of aspect 13, wherein the operational condition is a measured static temperature and a measured static pressure, and the second controller is configured to calculate the load ramp rate to limit the rate of change of the DC output power of the DC to DC converter.

16. The system as in any of aspects 10-15, wherein transient load control signal comprises an indication of a projected duration of application of the transient step change load to the load bus, the second controller further configured to limit the rate of change in response to the projected duration being greater than a predetermined period of time that would elicit unfavorable torque control action from the first controller.

17. A memory device having a plurality of instructions executable by a processor stored therein, the memory device being non-transitory and comprising:

instructions executable with the processor to control a gas turbine to rotate at a constant rated speed and a variable torque to drive a generator in accordance with a load being supplied by the generator;

instructions executable with the processor to control output of electric power with the generator to a power source bus;

instructions executable with the processor to control a level of a DC output power output by a DC to DC converter on a load bus, the DC to DC converter coupled to the power source bus as at least part of the load being supplied by the generator;

instructions executable with the processor to control supply to the load bus of DC power supplied from an energy storage device;

instructions executable with the processor to receive a transient load control signal indicative of an anticipated future occurrence of a step change load event on the load bus, wherein the step change load event is received on the load bus after receipt of the transient load control signal;

instructions executable with the processor to adjust a level of the DC output power of the DC to DC converter in response to the step change load event; and instructions executable with the processor to apply a constraint on a rate of change of the level of the DC output power of the DC to DC converter, the constraint applied based on the transient load signal to maintain the variable torque of the generator below a predetermined threshold as a load ramp rate of the DC to DC converter changes on the power source bus.

18. The memory device of aspect 17, further comprising instructions executable with the processor to obtain an expected duration of the step change load event from the transient load control signal, and instructions executable with the processor to disable constraint of the rate of change of the level of the DC output power in response to the expected duration being less than a predetermined threshold period of time.

19. The memory device as in either of aspect 17 or 18, further comprising instructions executable with the processor to vary the constraint on the rate of change of the level of the DC output power of the DC to DC converter based on operational parameters of the gas turbine.

20. The memory device as in any of aspects 17-19, further comprising instructions executable with the processor to apply the constraint on the rate of change of the level of the DC output power of the DC to DC converter based on operational conditions comprising at least one of a measured static temperature, a measured static pressure, or a measured altitude.

What is claimed is:

1. A method comprising:
controlling a gas turbine to rotate at a constant rated speed and a variable torque to drive a generator in accordance with a load being supplied by the generator;
outputting electric power with the generator to a power source bus;
energizing a DC to DC converter coupled to the power source bus as at least part of the load being supplied by the generator;
controlling a level of a DC output power output by the DC to DC converter on a load bus;
supplying the load bus with DC power supplied from an energy storage device;
receiving a transient load control signal indicative of an anticipated future occurrence of a step change load event on the load bus;
receiving the step change load event on the load bus after receipt of the transient load control signal;
adjusting the level of the DC output power of the DC to DC converter in response to the step change load event; and
applying a constraint on a rate of change of the level of the DC output power of the DC to DC converter, the constraint applied based on the transient load signal to maintain the variable torque of the generator below a predetermined threshold as a load ramp rate of the DC to DC converter changes on the power source bus.

2. The method of claim 1, wherein the transient load control signal comprises an indication of a projected magnitude of the step change load event, and wherein applying the constraint on the rate of change comprises varying the constraint on the rate of change based on the projected magnitude of the step change load event.

3. The method of claim 2, wherein varying the constraint on the rate of change comprises constraining the rate of change of the level of the DC output power of the DC to DC converter when the projected magnitude of the step change load event is greater than a predetermined step change that is projected to cause the variable torque of the generator to exceed a predetermined amount.

4. The method of claim 1, wherein the transient load control signal comprises an indication of a projected magnitude of the step change load event and a projected duration of the step change load event, and wherein applying the constraint on the rate of change comprises varying the constraint on the rate of change based on the projected duration of the step change load event only when the projected magnitude of the step change load event is greater than a predetermined amount.

5. The method of claim 4, wherein varying the constraint on the rate of change comprises constraining the rate of change of the level of the DC output power of the DC to DC converter when the projected duration is greater than a predetermined duration that causes the variable torque of the generator to exceed a predetermined amount due to the projected magnitude of the step change load event.

6. The method of claim 1, wherein receiving the transient load control signal comprises receiving an indication of a time of receipt of the step change load event, a duration of the step change load event, and a magnitude of the step change load event, wherein applying the constraint on the rate of change comprises initiating application of the constraint on the rate of change at the indicated time of receipt of the step change load event, based on the duration of the step change load event and the magnitude of the step change load event.

7. The method of claim 1, wherein applying a constraint on a rate of change of the level of the DC output power of the DC to DC converter comprises adjusting application of the constraint based on a sensed operational parameter of the gas turbine.

8. The method of claim 7, wherein the sensed operational parameter comprises at least one of an engine temperature, an engine flow rate, an engine pressure, an engine torque, an engine vibration level or an engine speed.

9. The method of claim 1, wherein applying the constraint on the rate of change of the level of the DC output power of the DC to DC converter comprises applying the constraint only when the level of the DC output power is increasing.

10. A system comprising:
a gas turbine;
a first controller configured to control the gas turbine to operate at a constant speed set point and a variable torque output;
a generator rotatably coupled with the gas turbine and configured to output electric power to a power source bus;
a DC to DC converter operable as a load on the power source bus;
a load bus coupled with an output of the DC to DC converter, the load bus configured to intermittently supply a transient step change load;
a second controller configured to control a DC output power of the DC to DC converter to supply the load bus and intermittently supply the transient step change load; and
an energy storage device configured to supply power to the load bus;
the second controller configured to limit a rate of change of the DC output power of the DC to DC converter during intermittent supply of the transient step change load subsequent to receipt of a transient load control signal, the transient load control signal anticipatory of application of the transient step change load to the load bus, the rate of change limited by the second controller to maintain the variable torque of the gas turbine below a predetermined threshold as a load ramp rate of the DC to DC converter changes on the power source bus.

11. The system of claim 10, wherein the transient load control signal comprises an indication of a projected duration of application of the transient step change load to the load bus, and the second controller is configured to limit the rate of change in response to the projected duration being greater than a predetermined period of time, and not limit the rate of change in response to the projected duration being less than or equal to the predetermined period of time.

12. The system of claim 11, wherein the transient load control signal comprises an indication of a projected magnitude of application of the transient step change load to the load bus, and the second controller is configured to limit the rate of change in response to the projected magnitude being greater than a predetermined value, and not limit the rate of change in response to the projected magnitude being less than or equal to the predetermined value.

13. The system of claim 10, wherein the second controller is configured to receive a signal indicative of an operational condition of the gas turbine, the second controller further configured to adjust the limit of the rate of change based on the operational condition.

14. The system of claim 13, wherein the operational condition is at least one of a vibration, an air flow or a temperature of the gas turbine.

15. The system of claim 13, wherein the operational condition is a measured static temperature and a measured static pressure, and the second controller is configured to calculate the load ramp rate to limit the rate of change of the DC output power of the DC to DC converter.

16. The system of claim 10, wherein transient load control signal comprises an indication of a projected duration of application of the transient step change load to the load bus, the second controller further configured to limit the rate of change in response to the projected duration being greater than a predetermined period of time that would elicit unfavorable torque control action from the first controller.

17. A memory device having a plurality of instructions executable by a processor stored therein, the memory device being non-transitory and comprising:
instructions executable with the processor to control a gas turbine to rotate at a constant rated speed and a variable torque to drive a generator in accordance with a load being supplied by the generator;
instructions executable with the processor to control output of electric power with the generator to a power source bus;
instructions executable with the processor to control a level of a DC output power output by a DC to DC converter on a load bus, the DC to DC converter coupled to the power source bus as at least part of the load being supplied by the generator;
instructions executable with the processor to control supply to the load bus of DC power supplied from an energy storage device;
instructions executable with the processor to receive a transient load control signal indicative of an anticipated future occurrence of a step change load event on the load bus, wherein the step change load event is received on the load bus after receipt of the transient load control signal;
instructions executable with the processor to adjust a level of the DC output power of the DC to DC converter in response to the step change load event; and
instructions executable with the processor to apply a constraint on a rate of change of the level of the DC output power of the DC to DC converter, the constraint applied based on the transient load signal to maintain the variable torque of the generator below a predetermined threshold as a load ramp rate of the DC to DC converter changes on the power source bus.

18. The memory device of claim 17, further comprising instructions executable with the processor to obtain an expected duration of the step change load event from the transient load control signal, and instructions executable with the processor to disable constraint of the rate of change of the level of the DC output power in response to the expected duration being less than a predetermined threshold period of time.

19. The memory device of claim 17, further comprising instructions executable with the processor to vary the constraint on the rate of change of the level of the DC output power of the DC to DC converter based on operational parameters of the gas turbine.

20. The memory device of claim 17, further comprising instructions executable with the processor to apply the constraint on the rate of change of the level of the DC output power of the DC to DC converter based on operational conditions comprising at least one of a measured static temperature, a measured static pressure, or a measured altitude.

* * * * *